United States Patent
Mei et al.

(10) Patent No.: US 10,876,602 B2
(45) Date of Patent: *Dec. 29, 2020

(54) BUILT-IN MOTOR FOR BICYCLE AND ELECTRIC POWERED BICYCLE

(71) Applicant: WUHAN TTIUM MOTOR TECHNOLOGY CO., LTD, Hubei (CN)

(72) Inventors: Liang Mei, Hubei (CN); Jun Chen, Hubei (CN); Hui Li, Hubei (CN)

(73) Assignee: WUHAN TITUM MOTOR TECHNOLOGY CO., LTD

( * ) Notice: Subject to any disclaimer, the term of this patent is extended or adjusted under 35 U.S.C. 154(b) by 0 days.

This patent is subject to a terminal disclaimer.

(21) Appl. No.: 16/310,345

(22) PCT Filed: May 26, 2017

(86) PCT No.: PCT/CN2017/086194
§ 371 (c)(1),
(2) Date: Dec. 14, 2018

(87) PCT Pub. No.: WO2018/001021
PCT Pub. Date: Jan. 4, 2018

(65) Prior Publication Data
US 2019/0331203 A1    Oct. 31, 2019

(30) Foreign Application Priority Data

Jul. 1, 2016   (CN) .......................... 2016 1 0514873

(51) Int. Cl.
*H02K 11/24*   (2016.01)
*F16H 3/72*    (2006.01)
(Continued)

(52) U.S. Cl.
CPC ............... *F16H 3/725* (2013.01); *B62M 6/40* (2013.01); *B62M 11/18* (2013.01); *F16H 61/66* (2013.01);
(Continued)

(58) Field of Classification Search
None
See application file for complete search history.

(56) References Cited

U.S. PATENT DOCUMENTS 6,672,418 B1 *   1/2004   Makino ................... B62M 6/45
                                          180/206.3
2005/0264112 A1 * 12/2005   Tanaka ................... B60B 27/02
                                          310/75 C
(Continued)

FOREIGN PATENT DOCUMENTS

CN    1754774 A     4/2006
CN    103171732 A   6/2013
(Continued)

OTHER PUBLICATIONS

The State Intellectual Property Office of People's Republic of China; Second Office Action of application CN 2016105148733; dated Nov. 7, 2018. Original Chinese and English translation.
(Continued)

*Primary Examiner* — Justin Holmes
(74) *Attorney, Agent, or Firm* — Joseph T. Leone, Esq.; DeWitt LLP (57) ABSTRACT

A built-in motor for a bicycle and an electric powered bicycle are provided. The built-in motor includes: a motor shell, a motor inner stator fixed in the motor shell by means of an inner stator frame; a motor outer rotor is installed on the inner stator frame, the motor outer rotor and a motor body output shaft being connected into a whole; a first planetary gear mechanism arranged in the inner stator frame,
(Continued)

and the first planetary gear mechanism being used for increasing input human force before outputting the same; a ring gear of the first planetary gear mechanism is connected with an elastic body, the elastic body being fixedly arranged in the inner stator frame; a torque sensor is arranged on the elastic body, the torque sensor being used for measuring the pedaling force provided by a rider to the bicycle.

18 Claims, 3 Drawing Sheets

(51) Int. Cl.
  *B62M 6/40* (2010.01)
  *B62M 11/18* (2006.01)
  *F16H 61/66* (2006.01)
  *G01L 3/04* (2006.01)
  *H02K 1/18* (2006.01)
  *H02K 7/00* (2006.01)
  *H02K 7/08* (2006.01)
  *H02K 7/108* (2006.01)
  *H02K 7/116* (2006.01)
  *H02K 21/22* (2006.01)
  *F16H 59/14* (2006.01)

(52) U.S. Cl.
  CPC ............... *G01L 3/04* (2013.01); *H02K 1/187* (2013.01); *H02K 7/003* (2013.01); *H02K 7/085* (2013.01); *H02K 7/108* (2013.01); *H02K 7/116* (2013.01); *H02K 11/24* (2016.01); *H02K 21/22* (2013.01); *F16H 59/14* (2013.01); *F16H 2059/147* (2013.01); *F16H 2200/2007* (2013.01)

(56) References Cited

U.S. PATENT DOCUMENTS

| | | | | |
|---|---|---|---|---|
| 2006/0287149 | A1* | 12/2006 | Mao | ..................... H02K 1/146 475/5 |
| 2010/0263959 | A1* | 10/2010 | Hoebel | ................... B62M 6/55 180/443 |
| 2016/0332696 | A1* | 11/2016 | Spaggiari | ............... H02K 7/116 |
| 2019/0161139 | A1* | 5/2019 | Chen | ........................ F16H 1/28 |

FOREIGN PATENT DOCUMENTS

| | | |
|---|---|---|
| CN | 103381875 A | 11/2013 |
| CN | 104104184 A | 10/2014 |
| CN | 104802912 A | 7/2015 |
| CN | 105966541 A | 9/2016 |
| CN | 205916282 U | 2/2017 |
| EP | 2799327 A1 | 11/2014 |
| JP | 9-309483 A | 12/1997 |

OTHER PUBLICATIONS

The State Intellectual Property Office of People's Republic of China; Search results as part of application CN 2016105148733.
The State Intellectual Property Office of People's Republic of China; International Search Report of application CN 201610514833; dated Aug. 3, 2017. Original Chinese, and English translation.

* cited by examiner

BUILT-IN MOTOR FOR BICYCLE AND ELECTRIC POWERED BICYCLE

CROSS-REFERENCE TO RELATED APPLICATIONS

This application claims priority to Chinese Patent Application No. 201610514873.3, filed with the Chinese Patent Office on Jul. 1, 2016, entitled "Built-in Motor for Bicycle", which is incorporated herein by reference in its entirety.

TECHNICAL FIELD

The present disclosure relates to the technical field of electric powered bicycles, and in particular to a built-in motor for a bicycle and to an electric powered bicycle.

BACKGROUND ART

An electric powered (boost) bicycle refers to a personal vehicle which is equipped with components such as a motor, a controller and so on based on an ordinary bicycle, and uses a battery as an auxiliary power supply. When using the electric powered bicycle, a rider still rides as usual, and the bicycle is powered (boosted) by the motor, and meanwhile the magnitude of the power of the motor can be automatically adjusted by the controller according to the riding situation of the rider. In order to measure a pedaling force provided by the rider to the bicycle, a torque sensing system is disposed (arranged) in the electric powered bicycle. The torque sensing system of the existing built-in motor for an electric powered bicycle has a complicated structure and has a low accuracy of measurement of the pedaling force.

SUMMARY

An object of the present disclosure is to provide a built-in motor for a bicycle, to solve the technical problems of the complicated structure and low accuracy of measurement of the torque sensing system of the built-in motor for a bicycle.

Another object of the present disclosure is to provide an electric powered bicycle.

Embodiments of the present disclosure are implemented by the following technical solutions:

A built-in motor for a bicycle, comprising: a motor housing, wherein a motor inner stator is fixed in the motor housing via an inner stator frame (rack); a motor outer rotor is mounted (installed) onto the inner stator frame, and the motor outer rotor is integrally connected with a motor body output shaft; a first planetary gear mechanism is disposed inside the inner stator frame, and the first planetary gear mechanism can be configured to accelerate and then output an input of manpower; an (inner) ring gear of the first planetary gear mechanism is connected with an elastic body, and the elastic body is fixedly mounted in the inner stator frame; a torque sensor is disposed on the elastic body, and the torque sensor can be configured to detect (measure) a pedaling force provided by a rider to the bicycle.

Further, the built-in motor for a bicycle further comprises a connector; and the elastic body is connected to the ring gear via the connector.

Further, the elastic body has an elongated shape; one end of the elastic body is fixedly connected to the inner stator frame, and the other end of the elastic body is connected to the connector; the torque sensor is located between both ends of the elastic body.

Further, the elastic body is arc-shaped, and the elastic body is coaxial with the ring gear of the first planetary gear mechanism.

Further, an axial limiting portion is disposed on the inner stator frame; and an end of the elastic body away from the connector is located between the axial limiting portion and the inner stator frame.

Further, the axial limiting portion is a bolt threadedly connected to the inner stator frame; and the end of the elastic body away from the connector is located between the inner stator frame and a head of the bolt.

Further, the end of the elastic body away from the connector is tightly pressed between the inner stator frame and the axial limit portion.

Further, the ring gear of the first planetary gear mechanism defines a fixing groove; the connector is embedded into the fixing groove, so as to be connected to the ring gear of the first planetary gear mechanism.

Further, a flange extending in an axial direction is disposed at a radial edge of the ring gear of the first planetary gear mechanism; and the fixing groove is a through groove penetrating (through) the flange in a radial direction.

Further, the connector passes through the fixing groove of the flange; and a protrusion is disposed on the connector, and the protrusion abuts against an inner circumferential surface of the flange.

Further, a second planetary gear mechanism is also fixed in the motor housing (shell), and the second planetary gear mechanism is connected to the motor body output shaft, and is disposed coaxially with the first planetary gear mechanism, the second planetary gear mechanism can be configured to decelerate and then output an input of the motor.

Further, the motor body output shaft is disposed coaxially with a central shaft of the bicycle, and the central shaft includes a first central shaft and a second central shaft which are sequentially connected.

Further, the first planetary gear mechanism serves as an acceleration mechanism in such a form of inputting by a planet carrier and outputting by a sun gear.

Further, a first one-way device is disposed between the planet carrier of the first planetary gear mechanism and the first central shaft.

Further, a ring gear of the second planetary gear mechanism is fixedly connected to the motor housing, and the second planetary gear mechanism serves as a deceleration mechanism in such a form of a sun gear input and a planet carrier output.

Further, a second one-way device is disposed between the planet carrier of the second planetary gear mechanism and the built-in motor output shaft.

Further, the first central shaft and the second central shaft are sequentially connected via a shaft connector.

Further, the inner stator frame and the motor housing are fixedly connected by bolts.

Further, the motor outer rotor is mounted on the inner stator frame via a bearing, and is integrally connected with the motor body output shaft.

An electric powered bicycle, comprises any one of the built-in motors for bicycles described above.

The technical solutions of the present disclosure have at least the following advantages and beneficial effects:

The built-in motor for a bicycle according to an embodiment of the present disclosure, comprises a motor housing, wherein a motor inner stator is fixed in the motor housing via an inner stator frame (not shown in the figure); wherein, a motor outer rotor is mounted on the inner stator frame, and the motor outer rotor is integrally connected with a motor body output shaft; specifically, a first planetary gear mechanism is disposed inside the inner stator frame, and the first planetary gear mechanism can be configured to accelerate and then output an input of manpower; further, a ring gear of the first planetary gear mechanism is connected with an elastic body, and the elastic body is fixedly mounted in the inner stator frame; and still further, a torque sensor is disposed on the aforesaid elastic body, and the torque sensor can be configured to detect a pedaling force provided by a rider to the bicycle. It can be seen from the analysis that in the built-in motor for a bicycle according to an embodiment of the present disclosure, the torque sensor is disposed on the elastic body at the ring gear of the first planetary gear mechanism, therefore the torque sensor does not need to circle with the rotation of the central shaft, and is capable of accurately measuring a pedaling force provided by the rider to the bicycle by means of a reverse torque transferred to the elastic body at the ring gear when the first planetary gear mechanism outputs power, and meanwhile the use of wireless power supply and wireless transmission modes is effectively avoided, thereby greatly simplifying the structural complexity (complication), and reducing the energy consumption and production cost of the system.

BRIEF DESCRIPTION OF DRAWINGS

For illustrating technical solutions of specific embodiments of the present disclosure or of the prior art more clearly, drawings required for use in the description of the specific embodiments or the prior art will be introduced briefly below. It is obvious that the drawings in the following description are illustrative of some embodiments of the present disclosure. It would be understood by those of ordinary skill in the art that other drawings could also be obtained from these drawings without any inventive effort.

REFERENCE NUMERALS

- 011—motor housing; 012—motor inner stator; 013—motor outer rotor; 014—motor body output shaft;
- 015—first planetary gear mechanism; 0151—first sun gear; 0152—first planet gear; 0153—first planet carrier; 0154—first ring gear; 0155—fixing groove; 0156—flange;
- 016—second planetary gear mechanism; 0162—second planet gear; 0163—second planet carrier; 0164—second ring gear;
- 017—first one—way device; 018—second one—way device; 019—built—in motor output shaft;
- 020—central shaft; 021—first central shaft; 022—second central shaft; 023—shaft connector;
- 031—elastic body;
- 032—torque sensor;
- 033—connector; 0331—protrusion;
- 040—inner stator frame; 041—axial limiting portion.

DETAILED DESCRIPTION OF EMBODIMENTS

The technical solutions of the present disclosure will be described below clearly and completely with reference to the accompanying drawings. It is apparent that the embodiments to be described are some, but not all of the embodiments of the present disclosure. All the other embodiments obtained by those of ordinary skill in the art in light of the embodiments of the present disclosure without inventive efforts would fall within the scope of the present disclosure as claimed.

In the description of the present disclosure, it should be noted that orientation or positional relations indicated by the terms such as "inner" and "outer" are the orientation or positional relations shown based on the figures, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, terms such as "first" and "second" are used for descriptive purpose only, and should not be understood as an indication or implication of relative importance.

In the description of the present disclosure, it should be noted that terms such as "mount" and "connect" should be understood broadly unless otherwise expressly specified or defined. For example, connection may be fixed connection or detachable connection or integral connection, or may be direct coupling or indirect coupling via an intermediate medium or internal communication between two elements. The specific meanings of the above-mentioned terms in the present disclosure could be understood by those of ordinary skill in the art according to specific situations.

First Embodiment

Figure 1:
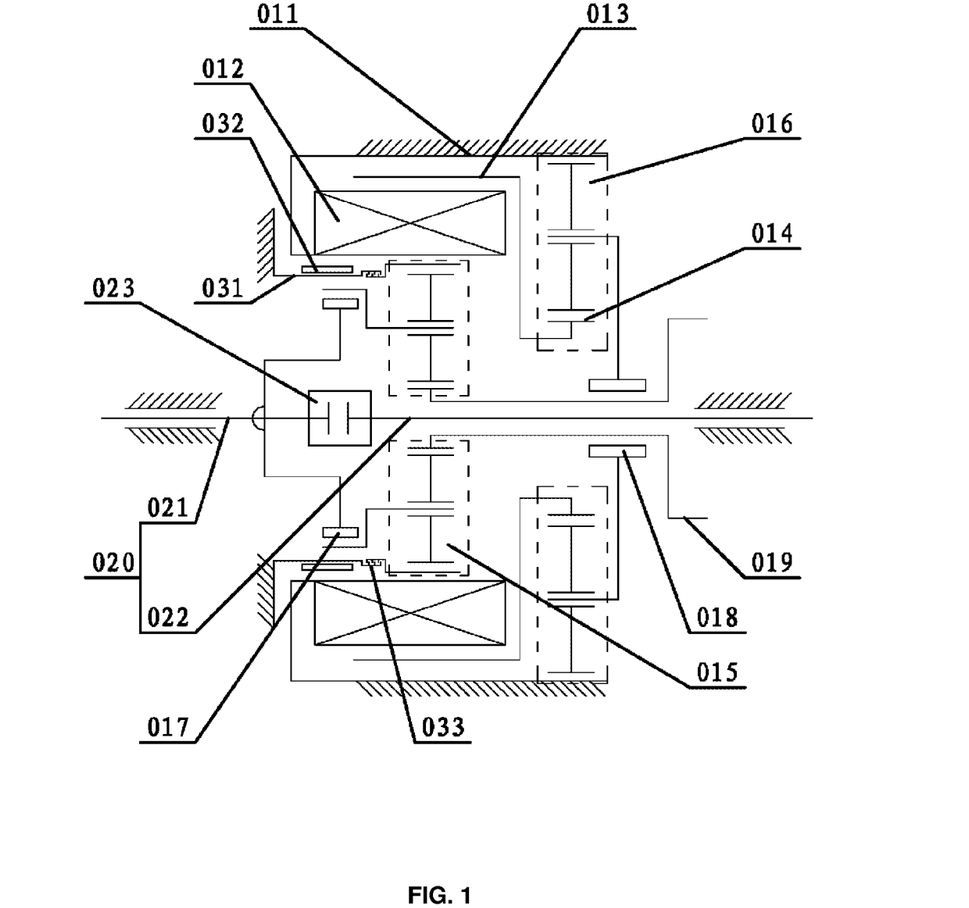
FIG. 1 is an operating principle diagram of a built-in motor for a bicycle according to an embodiment of the present disclosure.

FIG. 1 is an operating principle diagram of a built-in motor for a bicycle according to an embodiment of the present disclosure. A built-in motor for a bicycle according to an embodiment of the present disclosure, comprises a motor housing 011, a motor inner stator 012 being fixed in the motor housing 011 via an inner stator frame (not shown in the figure); a motor outer rotor 013 is mounted on the inner stator frame, and the motor outer rotor 013 is integrally connected with a motor body output shaft 014; a first planetary gear mechanism 015 is disposed inside the inner stator frame, and the first planetary gear mechanism 015 can be configured to accelerate and then output an input of manpower; a ring gear of the first planetary gear mechanism 015 is connected with an elastic body 031, and the elastic body 031 is fixedly mounted in the inner stator frame; a torque sensor 032 is disposed on the elastic body 031, and the torque sensor 032 can be configured to detect a pedaling force provided by a rider to the bicycle.

The built-in motor for a bicycle according to an embodiment of the present disclosure, as shown in FIG. 1, comprises, a motor housing 011; a motor inner stator 012 being fixed in the motor housing 011 via an inner stator frame (not shown in the figure); wherein a motor outer rotor 013 is mounted on the inner stator frame, and the motor outer rotor 013 is integrally connected with a motor body output shaft 014; specifically, a first planetary gear mechanism 015 is disposed inside the inner stator frame, and the first planetary gear mechanism 015 can be configured to accelerate and then output an input of manpower; further, a ring gear of the first planetary gear mechanism 015 is connected with an elastic body 031, and the elastic body 031 is fixedly mounted in the inner stator frame; and still further, a torque sensor 032 is disposed on the aforesaid elastic body 031, and the torque sensor 032 can be configured to detect a pedaling force provided by a rider to the bicycle. It can be seen from the analysis that in the built-in motor for a bicycle according to an embodiment of the present disclosure; the torque sensor 032 is disposed on the elastic body 031 at the ring gear of the first planetary gear mechanism 015, therefore the torque sensor 032 does not need to circle with the rotation of the central shaft, and is capable of accurately measuring a pedaling force provided by the rider to the bicycle by means of a reverse torque transferred to the elastic body 031 at the ring gear when the first planetary gear mechanism 015 outputs power, and meanwhile the use of wireless power supply and wireless transmission modes is effectively avoided, thereby greatly simplifying the structural complexity; and reducing the energy consumption and production cost of the system.

In the above, in order to facilitate the robust connection between the ring gear of the first planetary gear mechanism 015 and the elastic body 031, as shown in FIG. 1, in the built-in motor for a bicycle according to an embodiment of the present disclosure, the ring gear of the aforesaid first planetary gear mechanism 015 is connected to the elastic body 031 in a coaxial manner via a connector 033.

It should be additionally noted here that the built-in motor for a bicycle can detect, by the torque sensor (torsion sensor), a force applied by the rider to the bicycle when riding, so that a controller estimates the rider's riding intention, and controls an output of the built-in motor according to an output situation of manpower, to realize a coordination of the manpower output and the motor power output, so as to jointly drive the forwarding of the electric powered bicycle in accordance with an output ratio desired by the rider.

The inventors have found that, the built-in motors for bicycles usually use speed reduction (deceleration) motors with motor acceleration and deceleration mechanisms, and it can be classified by two types in structure: concentric shaft structure and parallel shaft structure; the concentric shaft structure means that the shaft of the motor is concentric and coaxial with the central shaft of the bicycle; and the parallel shaft structure means that the shaft of the motor is individually disposed at a position parallel to the central shaft of the bicycle. In practice, in order to ensure the forwarding speed of the electric powered bicycle, it is usually necessary to properly allocate a speed reduction ratio by the built-in motor, the built-in motor with the concentric shaft structure mostly employs a planetary gear speed reduction mechanism, so that the overall structure of the motor is more compact and occupies less room; and the built-in motor with the parallel shaft structure mostly employs a cylindrical gear speed reduction mechanism, and a relatively large speed reduction ratio can be obtained by multi-stage gear speed reduction, so that the motor has a relatively high rotation speed. However, the inventors of the present application have found that, the built-in motor with the concentric shaft structure tends to have a relatively low rotation speed and a relatively small power density due to being limited by a relatively low speed reduction of the planetary gear speed reduction mechanism, thereby making it impossible to have a full use of the performance of the motor; and the built-in motor with the parallel shaft structure tends to have a relatively large volume and is bulky as a whole due to the multi-stage cylindrical gear speed reduction mechanism used therein.

In order to solve the technical problems described above, in the built-in motor for a bicycle according to an embodiment of the present disclosure, as shown in FIG. 1, a second planetary gear mechanism 016 is also fixed in the motor housing 011 and the second planetary gear mechanism 016 is connected to the motor body output shaft 014, and is disposed coaxially with the first planetary gear mechanism 015, the second planetary gear mechanism 016 can be configured to decelerate and then output an input of the motor. The motor inner stator 012 is fixed in the motor housing 011 via the inner stator frame, and the first planetary gear mechanism 015 is disposed inside the inner stator frame, and meanwhile the motor outer rotor 013 is mounted on the inner stator frame, and the motor outer rotor 013 is integrally connected with the motor body output shaft 014, therefore the built-in motor can have a relatively compact structure, a relatively small volume, and a relatively light overall weight; in addition, the second planetary gear mechanism 016 is also fixed in the motor housing 011, and the second planetary gear mechanism 016 is connected to the motor body output shaft 014, and is disposed coaxially with the first planetary gear mechanism 015, and meanwhile the first planetary gear mechanism 015 can be configured to accelerate and then output an input of manpower, and the second planetary gear mechanism 016 can be configured to decelerate and then output an input of the motor, therefore the output rate of the manpower and the motor can be coordinated, and it is ensured that the built-in motor can maintain a relatively high rotation speed, so as to have a full use of the performance thereof.

In addition, in the built-in motor for a bicycle according to an embodiment of the present disclosure, the motor outer rotor 013 is mounted outside the motor inner stator 012, therefore the motor has the features of high power density and large output torque, whereby the performance of the built-in motor can be further fully used.

In practice, in order to effectively decrease the volume of the built-in motor, in the built-in motor for a bicycle according to an embodiment of the present disclosure, as shown in FIG. 1, the aforesaid motor body output shaft 014 is disposed coaxially with a central shaft 020 of the bicycle, and the central shaft 020 may include a first central shaft 021 and a second central shaft 022 which are sequentially connected, whereby the central shaft 020 has a relatively small shaft diameter by disposing the central shaft 020 as a segmented structure including the first central shaft 021 and the second central shaft 022, and meanwhile the motor body output shaft 014 is disposed coaxially with the central shaft 020, which can effectively spare the axial and radial room inside the built-in motor, thereby can effectively decrease the volume of the built-in motor, and can enable other parts and components inside the built-in motor to realize more functions.

Here, in order to ensure that the first planetary gear mechanism 015 can be configured to accelerate and then output an input of manpower, in the built-in motor for a bicycle according to an embodiment of the present disclosure, as shown in FIG. 1, the ring gear of the aforesaid first planetary gear mechanism 015 may be connected to the elastic body 031 in a coaxial manner via a connector 033, and the elastic body 031 may be fixedly mounted in the inner stator frame, and meanwhile the first planetary gear mechanism 015 may serve as an acceleration mechanism in such a form of inputting by a planet carrier and outputting by a sun gear.

Specifically, in order to facilitate the transmission of manpower, in the built-in motor for a bicycle according to an embodiment of the present disclosure, as shown in FIG. 1, a first one-way device 017 may be disposed between the planet carrier of the aforesaid first planetary gear mechanism 015 and the first central shaft 021, whereby manpower can be inputted through the central shaft 020, and be transferred to the planet carrier of the first planetary gear mechanism 015 through the first one-way device 017, and then the manpower is further accelerated and outputted through the sun gear of the first planetary gear mechanism 015.

Further, in order to ensure that the second planetary gear mechanism 016 can be configured to decelerate and then output an input of the motor, in the built-in motor for a bicycle according to an embodiment of the present disclosure, as shown in FIG. 1, a ring gear of the aforesaid second planetary gear mechanism 016 may be fixedly connected to the motor housing 011, and the second planetary gear mechanism 016 may serve as a deceleration mechanism in such a form of inputting by a sun gear and outputting by a planet carrier, that is to say, the motor body output shaft 014 may serve as the sun gear of the second planetary gear mechanism 016 to realize the input of power, and the planet carrier of the second planetary gear mechanism 016 is configured to decelerate and output the power.

Still further, in order to facilitate the transmission of the aforesaid power, in the built-in motor for a bicycle according to an embodiment of the present disclosure, as shown in FIG. 1, a second one-way device 018 may be disposed between the planet carrier of the aforesaid second planetary gear mechanism 016 and a built-in motor output shaft 019, whereby the power of the built-in motor can be outputted through the motor body output shaft 014, that is, the power is inputted through the sun gear of the second planetary gear mechanism 016, and transferred to the built-in motor output shaft 019, sequentially through the planet carrier of the second planetary gear mechanism 016 and the second one-way device 018, to realize the deceleration and output of the power.

In practice, in order to facilitate the coaxial sequential connection of the first central shaft 021 and the second central shaft 022 in the central shaft 020, in the built-in motor for a bicycle according to an embodiment of the present disclosure, as shown in FIG. 1, both of the aforesaid first central shaft 021 and second central shaft 022 have a hollow structure inside the shaft, and the first central shaft 021 and the second central shaft 022 may be sequentially connected via a shaft connector 023 there between.

Specifically, in order to facilitate being able to fix the motor inner stator 012 in the motor housing 011 via the inner stator frame, in the built-in motor for a bicycle according to an embodiment of the present disclosure, the aforesaid inner stator frame may be fixedly connected with the motor housing 011 by bolts there between, whereby the motor inner stator 012 is then fixed via the inner stator frame.

Further, in order to facilitate the assembly of the motor outer rotor 013 and meanwhile effectively reduce a friction coefficient during its movement, in the built-in motor for a bicycle according to an embodiment of the disclosure, the aforesaid motor outer rotor 013 may be mounted on the inner stator frame via a bearing, and is integrally connected with the motor body output shaft 014.

Second Embodiment

Figure 2:
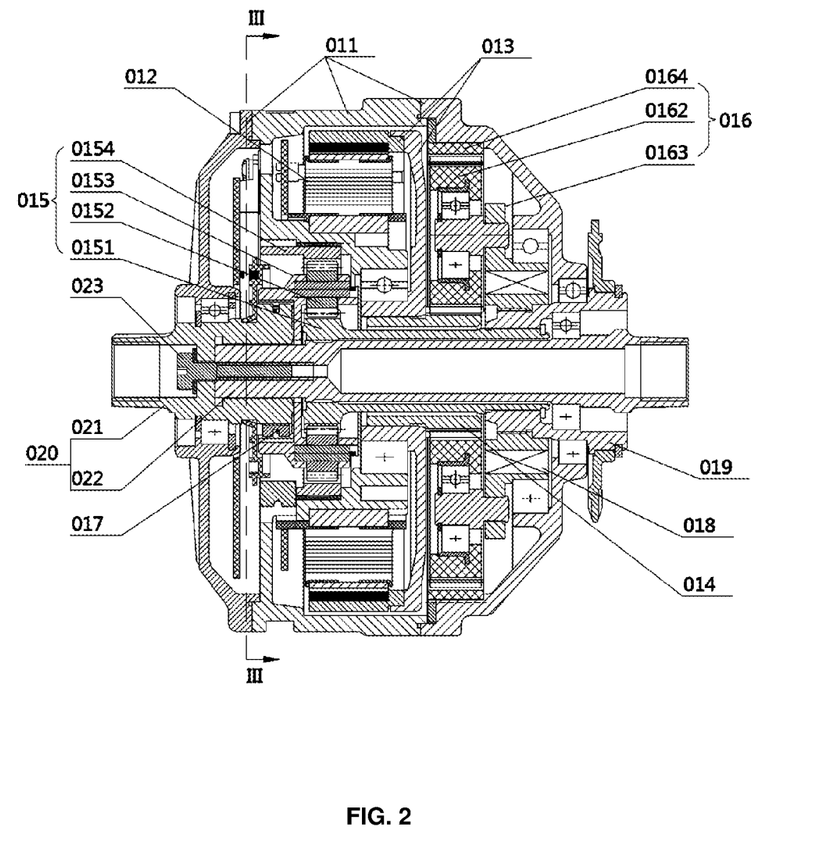
FIG. 2 is a schematic diagram showing an internal structure of a built-in motor for a bicycle according to an embodiment of the present disclosure.
Figure 3:
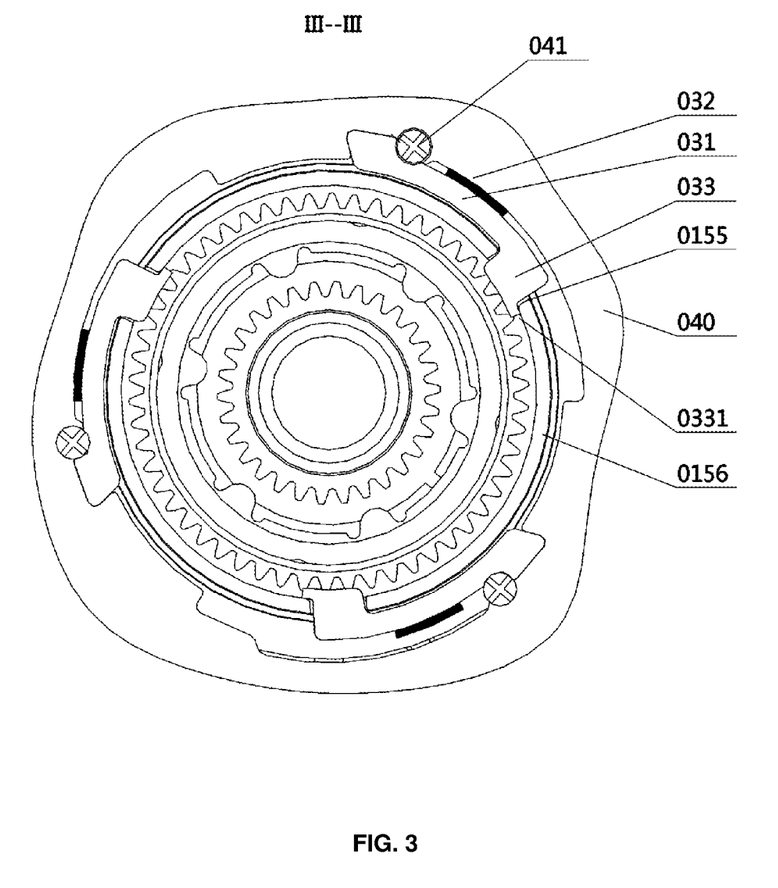
FIG. 3 is a sectional view taken along line III-III of FIG. 2.

FIG. 2 is a schematic diagram showing an internal structure of a built-in motor for a bicycle according to an embodiment of the present disclosure. FIG. 3 is a sectional view taken along line of FIG. 2. Please refer to FIG. 2 in combination with FIG. 3. A built-in motor for a bicycle according to an embodiment of the present disclosure, comprises a motor housing 011, a motor inner stator 012, a motor outer rotor 013, a motor body output shaft 014, a first planetary gear mechanism 015, a built-in motor output shaft 019, a central shaft 020, an elastic body 031, a torque sensor 032, and an inner stator frame 040.

With continued reference to FIG. 2, the central shaft 020 may rotatably penetrate through the motor housing 011. In the present embodiment, the central shaft 020 and the motor housing 011 are connected by a bearing, to realize a free rotation of the central shaft 020 regard to the motor housing 011. The central shaft 020 is configured to be connected to the pedal of the electric powered bicycle, to realize an input of manpower. The motor body output shaft 014 is sleeved (sheathed) on the central shaft 020 (with a gap there between), and is rotatable relative to the central shaft 020. The motor inner stator 012 is fixed in the motor housing 011 via the inner stator frame 040 (shown in FIG. 3), and the motor outer rotor 013 is mounted on the inner stator frame 040. The motor outer rotor 013 is penetrated through by the central shaft 020. The motor outer rotor 013 is connected to the motor body output shaft 014. When the motor outer rotor 013 is rotating, the motor body output shaft 014 transfers power generated during the rotation of the motor outer rotor 013. In the present embodiment, the motor outer rotor 013 is integrally connected to the motor body output shaft 014. The built-in motor output shaft 019 is mounted on the central shaft 020 via a bearing, and is rotatable relative to the central shaft 020. The built-in motor output shaft 019 is also connected with the motor housing 011 via a bearing there between, to be freely rotatable relative to the motor housing 011. The motor body output shaft 014 is in transmission connection with the built-in motor output shaft 019, for outputting power to the electric powered bicycle.

Continuously with reference to FIG. 2, in the present embodiment, the sun gear of the first planetary gear mechanism 015 is referred as a first sun gear 0151 the planet gear of the first planetary gear mechanism 015 is referred as a first planet gear 0152, the planet carrier of the first planetary gear mechanism 015 is referred as a first planet carrier 0153, and the ring gear of the first planetary gear mechanism 015 is referred as a first ring gear 0154. The first planetary gear mechanism 015 is sleeved on the motor body output shaft 014. The first planetary gear mechanism 015 operates in such a form of inputting by the first planet carrier 0153 and outputting by the first sun gear 0151. The first planet gear 0152 is in transmission connection with the central shaft 020, and the first sun gear 0151 is connected to the built-in motor output shaft 019. When it is necessary to drive a forwarding movement of the electric powered bicycle by manpower or to drive the forwarding movement of the electric powered bicycle by a hybrid of manpower and electric power, the manpower is transferred to the first planet carrier 0153 through the central shaft 020, the first planet carrier 0153 drives a rotation of the first sun gear 0151 through the first planet gear 0152, the first sun gear 0151 transfers power to the built-in motor output shaft 019, to realize the output of the power. Further, in the present embodiment, the first sun gear 0151 is cylindrical, and is sleeved on the central shaft 020. The first sun gear 0151 is connected to the built-in motor output shaft 019 through a gap between the motor body output shaft 014 and the central shaft 020.

Referring to FIG. 3, the elastic body 031 is fixedly mounted in the inner stator frame 040, and the elastic body 031 is connected to the first ring gear 0154. A torque sensor 032 is disposed on the elastic body 031. The torque sensor 032 can be configured to detect a pedaling force provided by the rider to the bicycle. When manpower drives the electric powered bicycle to move forward or a hybrid of manpower and electric power drives the electric powered bicycle to move forward, the manpower is transmitted to the central shaft 020 through the pedal of the electric powered bicycle, and the central shaft 020 rotates. The central shaft 020 drives a rotation of the first planet carrier 0153, and the first planet carrier 0153 drives a rotation of the first sun gear 0151 through the first planet gear 0152, and the first sun gear 0151 transfers power to the built-in motor output shaft 019. At this time, a torsion is applied to the first ring gear 0154. Since the first ring gear 0154 is connected to the inner stator frame 040 via the elastic body 031 the elastic body 031 prevents the rotation of the first ring gear 0154, the torsion applied to the first ring gear 0154 is transferred to the elastic body 031, and the elastic body 031 is deformed. The torque sensor 032 then detects the torsion applied to the elastic body 031 according to the deformation of the elastic body 031, so that the pedaling force provided by the rider to the bicycle can be measured. Since the torque sensor 032 detects the torsion transferred from the first ring gear 0154 to the elastic body 031 directly according to the deformation of the elastic body 031 thus the pedaling force provided by the rider to the bicycle can be accurately calculated. In addition, since the torque sensor 032 does not circle with the central shaft 020, a power supply structure for the torque sensor 032 is thus simplified, it is unnecessary to dispose a signal transmitting device such as a wireless signal transmitting and receiving device (or other non-contact signal transmitter), or the like, and it is also unnecessary to dispose a device for ensuring the signal strength such as a signal amplifier, a signal modulator, a signal conditioner, or the like, thereby greatly simplifying the structural complexity, and reducing the energy consumption and product cost of the system.

It should be additionally noted herein that the built-in motor for a bicycle can detect, by the torque sensor (torsion sensor), a force applied by the rider to the bicycle when riding, so that a controller estimates the rider's riding intention, and controls an output of the built-in motor according to an output situation of manpower, to realize a coordination of the manpower output and the motor power output, so as to jointly drive the forwarding of the electric powered bicycle in accordance with an output ratio desired by the rider.

With continued reference to FIG. 3, in the present embodiment, three elastic bodies 031 are disposed, and the three elastic bodies 031 are uniformly arranged around an axial center of the first ring gear 0154. It can be understood that in other embodiments, the quantity of the elastic bodies 031 may not be limited.

With continued reference to FIG. 3, in the present embodiment, the elastic body 031 is connected to the first ring gear 0154 via a connector 033. In this way, the connection between the elastic body 031 and the first ring gear 0154 can be more reliable. It can be understood that in other embodiments, the elastic body 031 may also be directly connected to the first ring gear 0154. Further, in the present embodiment, the elastic body 031 has an elongated shape. One end of the elastic body 031 is fixedly connected to the inner stator frame 040, and the other end of the elastic body 031 is connected to the connector 033. The torque sensor 032 is located between two ends of the elastic body 031. Since the deformation of the elastic body 031 is mainly concentrated between its two ends. With the structure described above, the deformation of the elastic body 031 can be detected by a greater extent by the torque sensor 032, and the detection accuracy is improved. It should be further noted that in the present embodiment, the elastic body 031 is arc-shaped, and the elastic body 031 is coaxial with the first ring gear 0154. Such a structure enables the torsion applied to the first ring gear 0154 to be transferred to the elastic body 031 as completely (fully) as possible, and enables the deformation of the elastic body 031 to be represented by the greatest extent in the length direction thereof, thereby improving the accuracy of detection by the torque sensor 032.

With continued reference to FIG. 3, in the present embodiment, an axial limiting portion 041 is disposed on the inner stator frame 040, and an end of the elastic body 031 away from the connector 033 is located between the axial limiting portion 041 and the inner stator frame 040. In this way, an axial displacement of the elastic body 031 relative to the first ring gear 0154 can be limited, so that the elastic body 031 can operate stably. In the present embodiment, the axial limiting portion 041 is a bolt threadedly connected to the inner stator frame 040, thereby realizing a detachable connection of the axial limiting portion 041 and the inner stator frame 040. The bolt has a head and a stud, and the head of the bolt protrudes from the stud in a radial direction of the stud. The end of the elastic body 031 away from the connector 033 is located between the head of the bolt and the inner stator frame 040, thereby limiting the axial displacement of the elastic body 031 relative to the first ring gear 0154. Preferably, the end of the elastic body 031 away from the connector 033 is tightly pressed between the axial limiting portion 041 and the inner stator frame 040, and in the present embodiment, the end of the elastic body 031 away from the connector 033 is tightly pressed between the head of the bolt and the inner stator frame 040, so as to better limit the axial displacement of the elastic body 031 relative to the first ring gear 0154.

With continued reference to FIG. 3, in the present embodiment, the connector 033 is connected to the first ring gear 0154 in the manner described below. The first ring gear 0154 defines a fixing groove 0155. The connector 033 is embedded into the fixing groove 0155, so as to be connected to the first ring gear 0154. The connection of the connector 033 to the first ring gear 0154 is realized by means of embedding the connector 033 into the fixing groove 0155, which makes the assembly easier, and reduces the difficulty in assembly. Further, in the present embodiment, a flange 0156 extending in an axial direction is disposed at a radial edge of the first ring gear 0154, and the fixing groove 0155 is a through groove penetrating through the flange 0156 in the radial direction. The connector 033 passes through the fixing groove 0155. A protrusion 0331 is disposed on the connector 033, and the protrusion 0331 abuts against an inner circumferential surface of the flange 0156. In this way, the connector 033 can be prevented from being detached from the fixing groove 0155, and the operational reliability is improved.

The inventors have found that the built-in motors for bicycles usually use speed reduction motors with motor acceleration and deceleration mechanisms, and it can be classified into two types in structure: concentric shaft structure and parallel shaft structure; the concentric shaft structure means that the shaft of the motor is concentric and coaxial with the central shaft of the bicycle; and the parallel shaft structure means that the shaft of the motor is individually disposed at a position parallel to the central shaft of the bicycle. In practice, in order to ensure the forwarding speed of the electric powered bicycle, it is usually necessary to properly allocate a speed reduction ratio by the built-in motor, the built-in motor with the concentric shaft structure mostly employs a planetary gear speed reduction mechanism, so that the overall structure of the motor is more compact and occupies less room; and the built-in motor with the parallel shaft structure mostly employs a cylindrical gear speed reduction mechanism, and a relatively large speed reduction ratio can be obtained by multi-stage gear speed reduction, so that the motor has a relatively high rotation speed. However, the inventors of the present application have found that, the built-in motor with the concentric shaft structure tends to have a relatively low rotation speed and a relatively small power density due to being limited by a relatively low speed reduction of the planetary gear speed reduction mechanism, thereby making it impossible to have a full use of the performance of the motor; and the built-in motor with the parallel shaft structure tends to have a relatively large volume and is bulky as a whole due to the multi-stage cylindrical gear speed reduction mechanism used therein.

In order to solve the technical problems described above, in the built-in motor for a bicycle according to an embodiment of the present disclosure, as shown in FIG. 2, a second planetary gear mechanism 016 is also fixed in the motor housing 011. In the present embodiment, the planet gear of the second planetary gear mechanism 016 is referred as a second planet gear 0162, the planet carrier of the second planetary gear mechanism 016 is referred as a second planet carrier 0163, and the ring gear of the second planetary gear mechanism 016 is referred as a second ring gear 0164. A outer circumferential surface of the motor body output shaft 014 is provided with teeth, and meshes with the second planet gear 0162, and the motor body output shaft 014 serves as a sun gear of the second planetary gear mechanism 016. The second planetary gear mechanism 016 operates in such a form of inputting by the solar power (sun gear) and outputting by the second planet carrier 0163. The second ring gear 0164 is fixedly connected to the motor housing 011. The second planet carrier 0163 is in transmission connection with the built-in motor output shaft 019. The second planetary gear mechanism 016 is capable of decelerating and then outputting an input of the motor, and the first planetary gear mechanism 015 is capable of accelerating and then outputting an input of manpower, therefore the output rate of the manpower and the motor can be coordinated, and it is ensured that the built-in motor can maintain a relatively high rotation speed, so as to have a full use of the performance thereof.

In addition, in the built-in motor for a bicycle according to an embodiment of the present disclosure, the motor outer rotor 013 is mounted outside the motor inner stator 012, therefore it has the features of high power density and large output torque, whereby the performance of the built-in motor can be further fully used.

With continued reference to FIG. 2, in order to effectively decrease the volume of the built-in motor for a bicycle, in the built-in motor for a bicycle according to an embodiment of the present disclosure, as shown in FIG. 1, the motor body output shaft 014 is disposed coaxially with a central shaft 020 of the bicycle, and the central shaft 020 may include a first central shaft 021 and a second central shaft 022 which are sequentially connected. The central shaft 020 has a relatively small shaft diameter by disposing the central shaft 020 as a segmented structure including the first central shaft 021 and the second central shaft 022, and meanwhile the motor body output shaft 014 is disposed coaxially with the central shaft 020, which can effectively spare the axial and radial room inside the built-in motor, thereby can effectively decrease the volume of the built-in motor, and can enable other parts and components inside the built-in motor to realize more functions. Further, in order to facilitate the coaxial sequential connection of the first central shaft 021 and the second central shaft 022 of the central shaft 020, in the present embodiment, both of the first central shaft 021 and the second central shaft 022 have a hollow structure inside the shaft, and the first central shaft 021 and the second central shaft 022 may be sequentially connected via a shaft connector 023 there between.

In order to facilitate being able to fix of the motor inner stator 012 in the motor housing 011 via the inner stator frame 040, in the present embodiment, the aforesaid inner stator frame 040 may be fixedly connected with the motor housing 011 by bolts, whereby the motor inner stator 012 is then fixed via the inner stator frame 040. In order to facilitate the assembly of the motor outer rotor 013, and meanwhile effectively reduce a friction coefficient during its movement, in the present embodiment, the motor outer rotor 013 may be mounted on the inner stator frame 040 via a bearing, and is integrally connected with the motor body output shaft 014.

In order to facilitate the transmission of manpower, in the built-in motor for a bicycle according to an embodiment of the present disclosure, as shown in FIG. 2, a first one-way device 017 may be disposed between the planet carrier of the first planetary gear mechanism 015 and the first central shaft 021, whereby manpower can be inputted through the central shaft 020, and transferred to the planet carrier of the first planetary gear mechanism 015 through the first one-way device 017, and then the manpower is accelerated and outputted through the sun gear of the first planetary gear mechanism 015. Referring to FIG. 3, a torsion in direction A in FIG. 3 is applied to the first ring gear 0154 under the action of the first one-way device 017, so that the first ring gear 0154 has a tendency to rotate in the direction A. In order to facilitate the transmission of the power of the motor, in the present embodiment, as shown in FIG. 2, a second one-way device 018 may be disposed between the planet carrier of the second planetary gear mechanism 016 and the built-in motor output shaft 019, whereby the power of the built-in motor for a bicycle can be outputted through the motor body output shaft 014, that is, the power is inputted through the sun gear of the second planetary gear mechanism 016, and transferred to the built-in motor output shaft 019 sequentially through the planet carrier of the second planetary gear mechanism 016 and the second one-way device 018, to realize the deceleration and output of the power.

Third Embodiment

The present embodiment provides an electric powered bicycle (not shown) having a built-in motor for a bicycle described in the first embodiment or the second embodiment.

INDUSTRIAL APPLICABILITY

In the built-in motor for a bicycle according to an embodiment of the present disclosure, the torque sensor is disposed on the elastic body at the ring gear of the first planetary gear mechanism, therefore the torque sensor does not need to circle with the rotation of a central shaft, and is capable of accurately measuring a pedaling force provided by the rider to the bicycle by means of a reverse torque transferred to the elastic body at the ring gear when power is outputted by the first planetary gear mechanism, and meanwhile the use of wireless power supply and wireless transmission modes is effectively avoided, thereby greatly simplifying the structural complexity, and reducing the energy consumption and production cost of the system.

Finally, it should be noted that the above embodiments are merely intended to illustrate the technical solutions of the present disclosure, but are not intended to limit the same; although the present disclosure has been described in detail with reference to the foregoing embodiments, it should be understood by those of ordinary skill in the art that the technical solutions described in the foregoing embodiments may be modified, or some or all of the technical features may be equivalently replaced; and these modifications or replacements will not cause the essence of the corresponding technical solutions to deviate from the scope of the technical solutions of the embodiments of the present disclosure.

The invention claimed is:

1. A built-in motor for a bicycle, comprising: a motor housing, wherein a motor inner stator is fixed in the motor housing via an inner stator frame; a motor outer rotor is mounted on the inner stator frame, and the motor outer rotor is integrally connected with a motor body output shaft;
a first planetary gear mechanism is disposed inside the inner stator frame, and the first planetary gear mechanism can be configured to accelerate and then output an input of manpower;
a ring gear of the first planetary gear mechanism is connected with an elastic body, and the elastic body is fixedly mounted in the inner stator frame; a torque sensor is disposed on the elastic body, and the torque sensor can be configured to detect a pedaling force provided by a rider to the bicycle,
wherein the built-in motor for a bicycle further comprises a connector; and the elastic body is connected to the ring gear via the connector, or is directly connected to the ring gear,
the elastic body is in an L shape; one end of the elastic body is fixedly connected to the inner stator frame, and the other end of the elastic body is connected to the connector, or is directly connected to the ring gear; and the torque sensor is located between two ends of the elastic body.

2. The built-in motor for a bicycle according to claim 1, wherein the elastic body is C-shaped, and the elastic body is coaxial with the ring gear of the first planetary gear mechanism.

3. The built-in motor for a bicycle according to claim 1, wherein an axial limiting portion is disposed on the inner stator frame; and an end of the elastic body away from the connector is located between the axial limiting portion and the inner stator frame.

4. The built-in motor for a bicycle according to claim 3, wherein the axial limiting portion is a bolt threadedly connected to the inner stator frame; and the end of the elastic body away from the connector is located between the inner stator frame and a head of the bolt.

5. The built-in motor for a bicycle according to claim 3, wherein the end of the elastic body away from the connector is tightly pressed between the inner stator frame and the axial limit portion.

6. The built-in motor for a bicycle according to claim 1, wherein the ring gear of the first planetary gear mechanism defines a fixing groove; and the connector is embedded into the fixing groove, so as to be connected to the ring gear of the first planetary gear mechanism.

7. The built-in motor for a bicycle according to claim 6, wherein a flange extending in an axial direction is disposed at a radial edge of the ring gear of the first planetary gear mechanism; and the fixing groove is a through groove penetrating through the flange in a radial direction.

8. The built-in motor for a bicycle according to claim 7, wherein the connector passes through the fixing groove of the flange; and a protrusion is disposed on the connector, and the protrusion abuts against an inner circumferential surface of the flange.

9. The built-in motor for a bicycle according to claim 1, wherein a second planetary gear mechanism is also fixed in the motor housing, and the second planetary gear mechanism is connected to the motor body output shaft, and is disposed coaxially with the first planetary gear mechanism, and the second planetary gear mechanism can be configured to decelerate and then output an input of the motor.

10. The built-in motor for a bicycle according to claim 9, wherein the motor body output shaft is disposed coaxially with a central shaft of the bicycle, and the central shaft comprises a first central shaft and a second central shaft which are sequentially connected.

11. The built-in motor for a bicycle according to claim 10, wherein the first planetary gear mechanism serves as an acceleration mechanism in such a form of inputting by a planet carrier and outputting by a sun gear.

12. The built-in motor for a bicycle according to claim 11, wherein a first one-way device is disposed between the planet carrier of the first planetary gear mechanism and the first central shaft.

13. The built-in motor for a bicycle according to claim 12, wherein a ring gear of the second planetary gear mechanism is fixedly connected to the motor housing, and the second planetary gear mechanism serves as a deceleration mechanism in such a form of inputting by a sun gear and outputting by a planet carrier.

14. The built-in motor for a bicycle according to claim 13, wherein a second one-way device is disposed between the planet carrier of the second planetary gear mechanism and the built-in motor output shaft.

15. The built-in motor for a bicycle according to claim 10, wherein the first central shaft and the second central shaft are sequentially connected via a shaft connector.

16. The built-in motor for a bicycle according to claim 1, wherein the inner stator frame and the motor housing are fixedly connected by bolts.

17. The built-in motor for a bicycle according to claim 1, wherein the motor outer rotor is mounted on the inner stator frame via a bearing, and is integrally connected with the motor body output shaft.

18. An electric powered bicycle, comprising a built-in motor for a bicycle according to claim 1.

* * * * *